Feb. 10, 1925. 1,525,432
M. A. ADAM ET AL
HANDLING AND TREATMENT OF LOOSE MATERIALS
Filed May 24, 1924 5 Sheets-Sheet 2
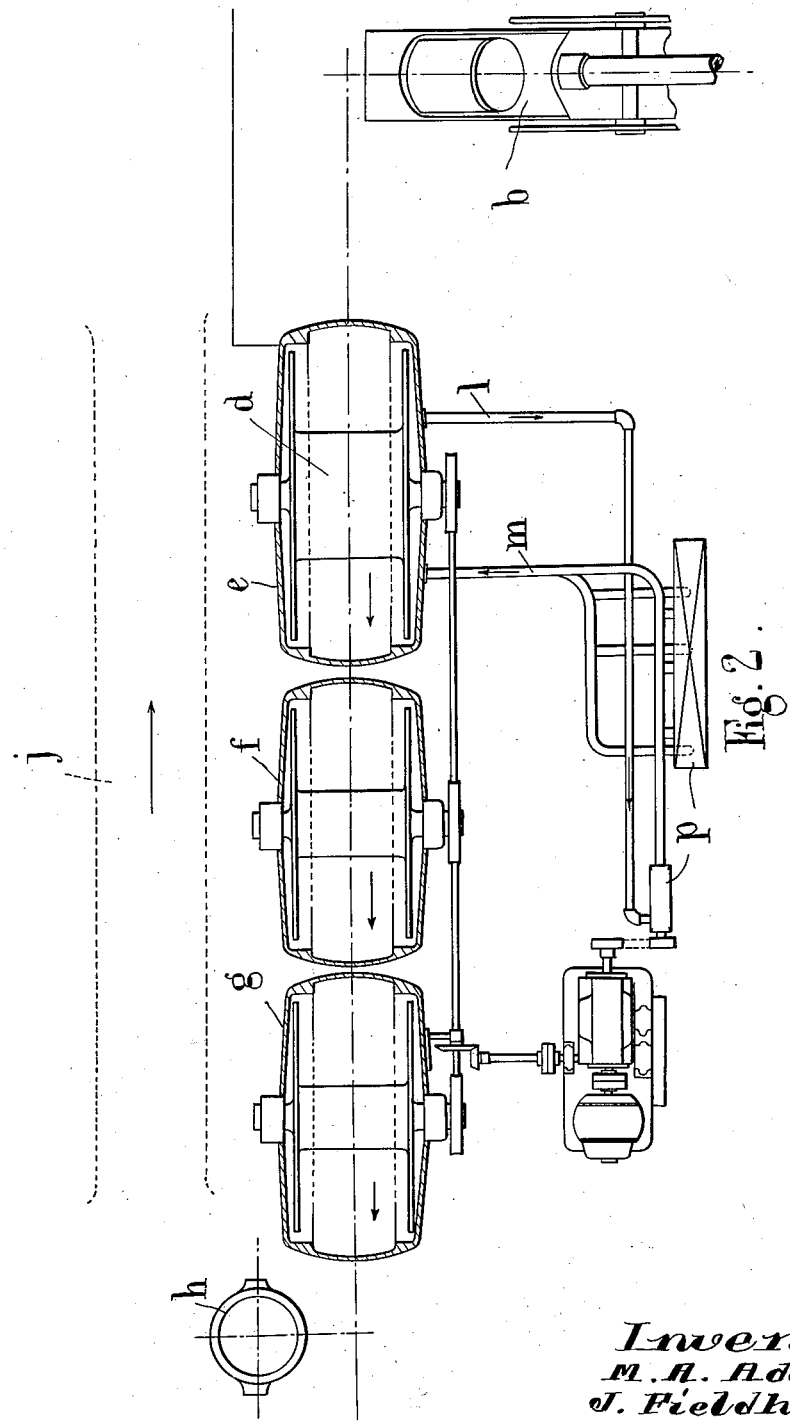
Inventors
M. A. Adam
J. Fieldhouse
R. Baillie
By Marks & Clerk
Attys.

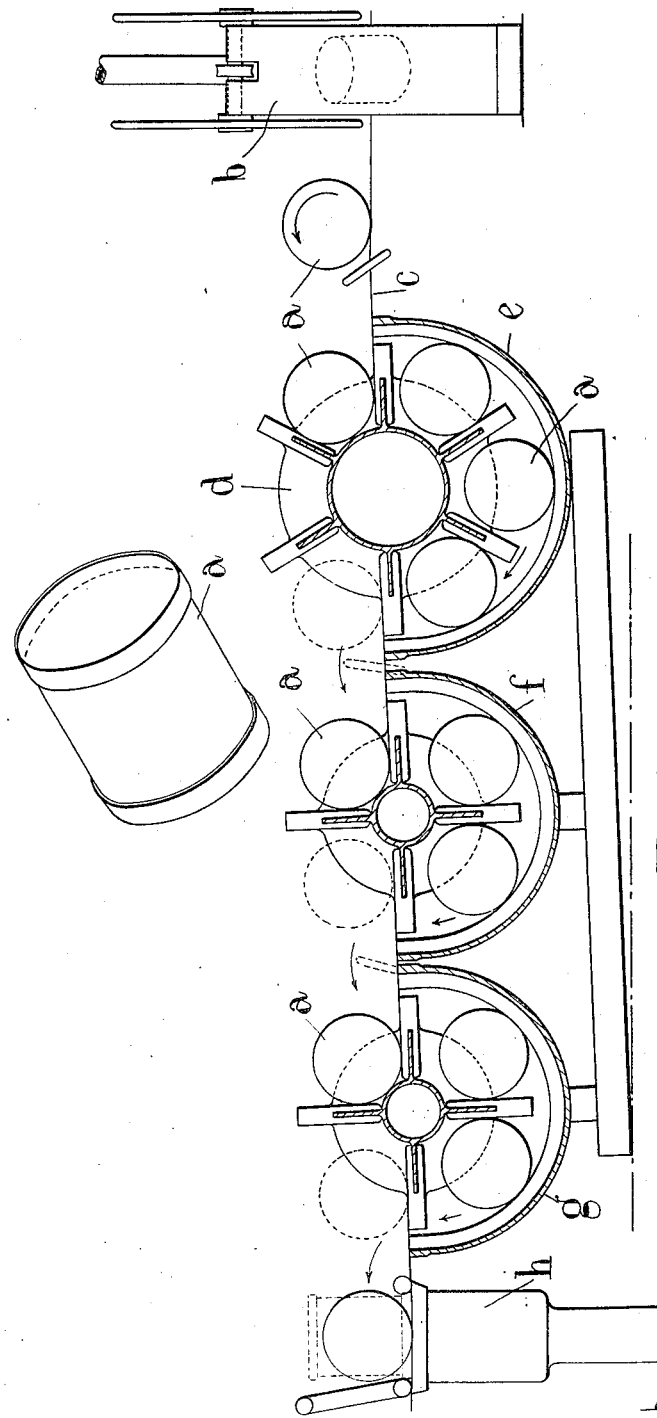

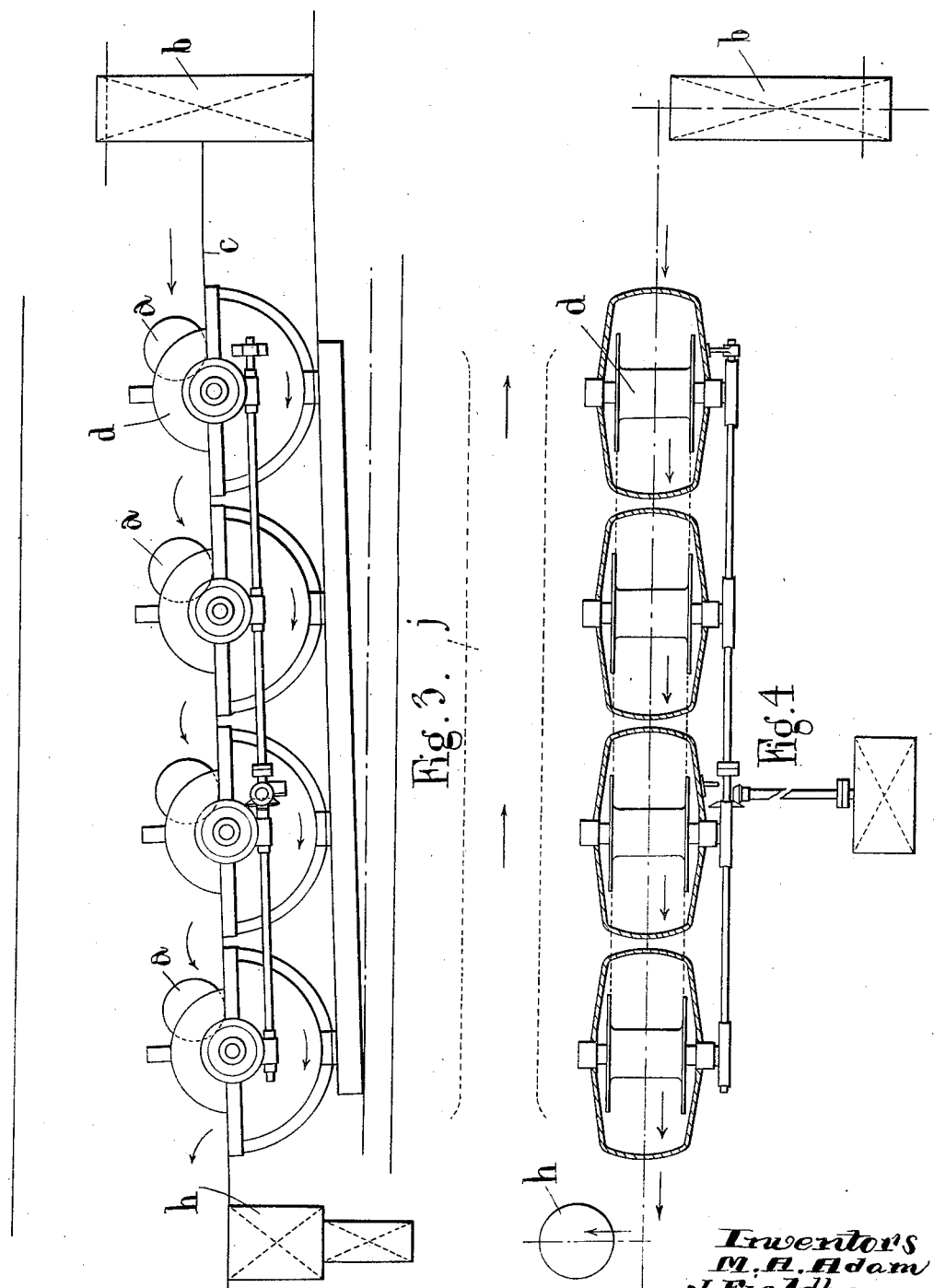

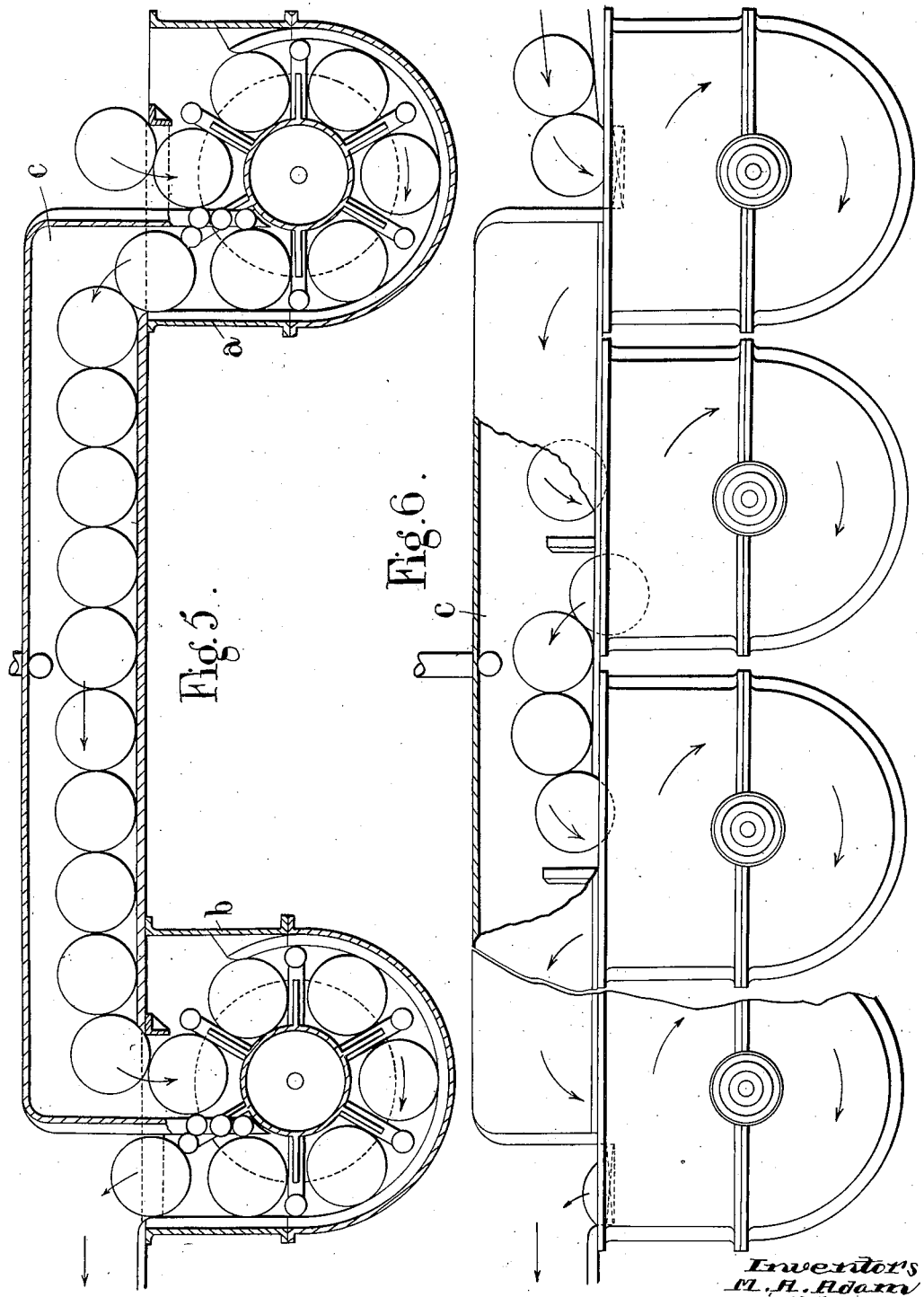

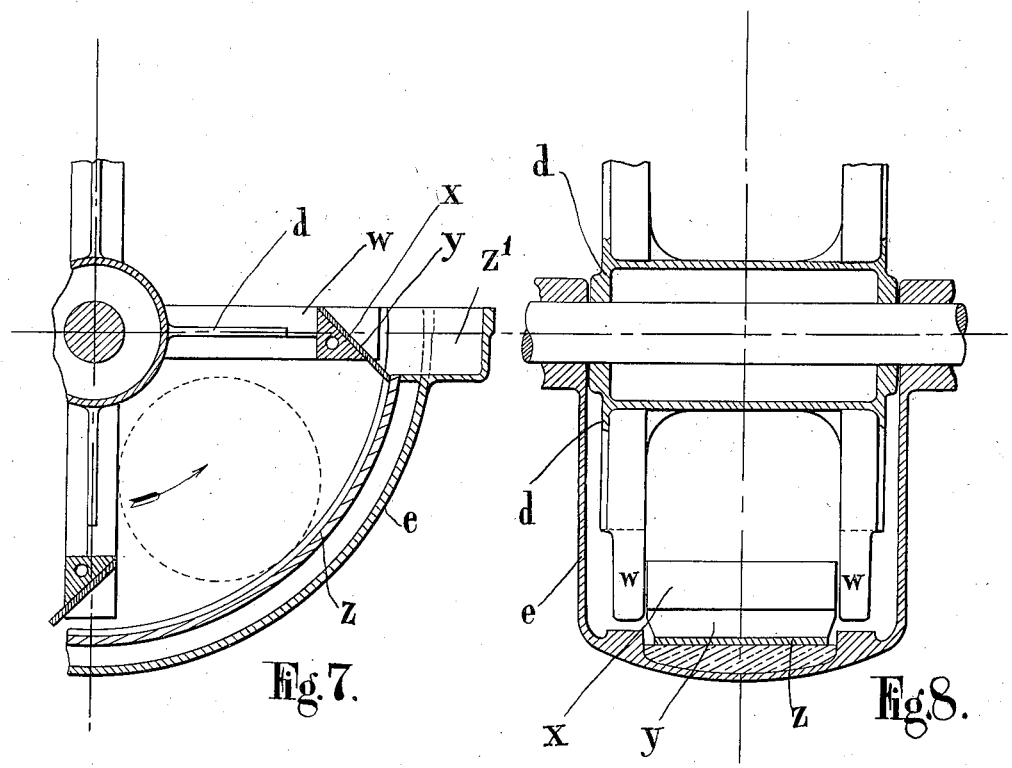

Patented Feb. 10, 1925.

1,525,432

UNITED STATES PATENT OFFICE.

MATTHEW ATKINSON ADAM, JOHN FIELDHOUSE, AND ROBERT BAILLIE, OF LONDON, ENGLAND; SAID FIELDHOUSE AND SAID BAILLIE ASSIGNORS TO SAID ADAM.

HANDLING AND TREATMENT OF LOOSE MATERIALS.

Application filed May 24, 1924. Serial No. 715,599.

*To all whom it may concern:*

Be it known that we, MATTHEW ATKINSON ADAM, JOHN FIELDHOUSE, and ROBERT BAILLIE, all British subjects, and all residing at 6 Featherstone Buildings, High Holborn, London, W. C. 1, England, have invented certain new and useful Improvements Relating to Handling and Treatment of Loose Materials, of which the following is a specification.

This invention relates to the handling and treatment of loose materials, such as tinned iron scrap, as for the purposes of cleaning and stripping the tin therefrom; or, again, loose articles which have to be pickled, it is economically important to minimize, on the one hand, the labour involved in working such processes and, on the other, also to minimize the capital cost of the plant.

The object of the present invention is to reconcile these rather contradictory requirements.

The invention consists in a continuous process for the treatment of loosely bundled materials (e. g., fragments of tinned scrap) with a stripping fluid in which the material is carried in separate cylindrical perforated containers which are passed in series with a rolling motion through one or more vessels containing wheels with spokes between which the cylindrical containers are carried with or without an additional chamber for treating the material.

The invention further consists in a process as set forth in the preceding paragraph, in which the containers are submerged in a treating liquid contained in a semicylindrical trough through which the liquid is actively circulated.

The invention also consists in a process as set forth in either of the preceding two paragraphs, in which one or more spoked wheels are power driven.

The invention also consists in a process as set forth in the preceding paragraphs, in which electrolysis is arranged to take place between the material in the containers and a suitable cathode in one or more of the vessels.

The invention also consists in a process as set forth in the preceding paragraph in which the electrolytic deposit is removed mechanically.

The invention also consists in a continuous process for the treatment of loosely bundled materials (e. g., fragments of tinned scrap) with a stripping fluid in which the material is carried in separate cylindrical perforated containers which are passed in series with a rolling motion through one or more vessels containing wheels with spokes between which the cylindrical containers are carried, and in which two or more spoked wheels in suitable containers are used as seals for a gaseous treatment vessel.

The invention further consists in various features of plant construction and operation or combinations thereof hereinafter indicated or described.

In carrying this invention into effect in one form by way of example as applied to the detinning of tinned iron scrap by the process of British Patent No. 154,242, using strong tin and iron chlorides as the chemical reagent, the scrap is filled into cylindrical cages or drums of perforated metal or coarse gauze conveniently of a length not much greater than their diameter, say eighteen to thirty inches. These cages or drums are provided externally with rolling rings, providing rolling contact with the floor or suitable rails thereon, and internally may have longitudinal strips to facilitate filling or emptying. The drums are filled at a suitable density with the scrap and are rolled down a suitable platform or floor to the first treating vessel where they are fed through, at a suitable speed and by means of a sort of spoked wheel, the detinning solution.

It is preferred that the spoked controlling wheel be actuated by power and that the containing vessel be made of cast iron so treated internally by means of (*a*) acid resisting unvulcanized rubber, or (*b*) blue brick tiles set in acid-proof cement, as to prevent corrosion. It is also preferred that the said proofing shall be such as to have as little resistance as possible to heat conductivity, in order that the treating vessel may be directly heated to maintain the active solution at a suitable temperature and thus to minimize heat losses. Conveniently, the controlling spoked wheel has six pockets circumferentially between its arms each of which is adapted to receive a drum. The platforms or the like leading to and from the treating vessel are slightly inclined, gravity thus assisting the feed of the drums, which may also be controlled by one or more pivoted stops put into action by the operator. Similar vessels may, when desirable, be set in series with the main treating one to provide washing and alkali treatment to the detinned iron scrap.

On completing their chemical treatment the drums may pass on to a press and after being emptied may be returned for refilling.

A rapid circulation of the solution in the treating vessel is kept up by a suitable pump, the activating chlorine preferably being introduced into the stream as it passes through the scrap, and the active solution is passed through a convenient arrangement of piping to electrolyzers where the tin or part thereof in solution may be recovered. It is proposed to use a form of electrolyzer as described in Patent No. 154,635.

This plant using circular section baling may be applied with any other process for stripping scrap and in some cases the treating vessel itself is constructed as an electrolyzer. The vessel in that case has rails as before and sunk below the rails a cathode is mounted whose surface is swept by a member carrying rubber strips arranged parallel to or at an angle to the wheel axis for the purpose of carrying the loosely deposited metal to a cathode sump of small liquid volume for removal. The sweeping member may be attached conveniently to the spokes of the wheel or independent sweeping members of segmental form may be moved independently of the wheel. In this latter case a fixed perforated partition may be used between the rotating container and the cathode to prevent any protruding loose material from making electrical connection between the cathode and the container. In this case the drum-shaped containers or the like or their contents are themselves the anode, suitable connections being provided. This arrangement is specially convenient for the well-known alkaline electrolytic detinning processes.

In carrying this invention into effect as applied to treatment with gases as, for example, the well-known process using chlorine for stripping tin scrap, similar arrangements are used as described above, but a controlling rotor is used as the sealing entrance to a closed vessel containing chlorine gas through which the drums are fed continuously as desired. The closed vessel may also consist of one or more casings in which power-driven rotors are enclosed and thus space is economized while output is maintained.

In one arrangement, the rotor chamber is filled with carbon tetrachloride and a division forming a liquid seal separating the inlet from the outlet is provided. The outer or inlet side may have a layer of water thereon and the drums and their contents pass down through this and thus under the sealing partition and are then fed up into the chlorine chamber through the carbon tetrachloride. Any water carried by the entering scrap is not carried forward but is displaced by the carbon tetrachloride which is not miscible therewith. The chlorine chamber is suitably sealed at the other end in such a way as to permit of practically continuous working while allowing sufficient contact time for the reaction. A similar rotor having a liquid seal at the outlet is suitable for this purpose and on exit the drums may pass through a heating arrangement to distil off any gas, liquid or liquids carried over from the seal.

In another arrangement of plant, the seals may be effected by means of the well-known pairs of flap doors similar to those used for air locks in refrigerating plant. In each case the gas reaction chamber is such as to provide a path of travel of suitable length to provide the required time for the reaction and the charged drums move through from one end to the other mainly under gravity continuously or intermittently. The air in the drums should be replaced by chlorine in the locking seals in the case where liquid sealing is not used.

The flow or movement of the containers or the like is always in the same direction but their travel through the machine may be intermittent to allow of a longer time reaction when desired.

Instead of arranging the flow or movement of the bales through the treating rotors or the like in the plane of their rotation, the latter may be arranged transversely and the diameter of a bale may be provided between each rotor to aid spacing. The rotor in this case should be made of such a character that it will carry the weight of the bales clear of the vessel in all positions.

Referring to the accompanying diagrammatic drawings:—

Figure 1 represents a typical arrangement of three treating vessels, in one of which the detinning takes place and in the other two of which washing and alkali treatment are provided respectively.

Convenient presses are also illustrated in this figure.

Figure 2 consists of a plan of an arrangement as represented in Figure 1, showing a method of rotating the controlling wheels.

Figure 3 represents a five tank arrangement on the same lines as Figure 1, the two extra tanks being required for dedecoration, where necessary, of the tin scrap before detinning.

Figure 4 represents a plan of Figure 3.

Figures 5 and 6 represent elevations, respectively, of the application of the invention to the gaseous process and of a further development of the same.

Figures 7 and 8 represent diagrammatically part side and end sectional views of a wheel and treating vessel for electrolytic treatment of the stripping solution.

Referring to Figures 1 and 2 by way of example, the tin scrap is packed into the drums, a, say by means of the press, b, and the whole are rolled down the incline c, past an arresting flap c', into the arms of the slowly rotating regulating wheel, d. The drums and contents are then slowly rolled on the rails e' through the dissolving solution in the tank e. When the drums of tin scrap have passed through the first tank they roll on, due to the incline, into and through in a similar manner a second tank, f, containing water and thence, conveniently, through a third tank g, containing an alkaline solution. From the last treating tank the drums roll on to a suitable press, h, where the detinned contents are baled after being ejected from their respective containing drums. The empty drums are then rolled back along the floor or opposite incline, j, to the packing press, b, for refilling. There may be any convenient number of drums and the action is thus rendered perfectly continuous.

The solution in tank e is kept continuously circulating through the pipes, l and m, and also to and from convenient electrolyzers, p.

Where decorated tin scrap is to be dealt with, an arrangement as in Figures 3 and 4 is resorted to and includes extra tanks for dedecorating. The action is similar to that of the aforementioned three tank plant.

In applying the invention to the gaseous process, two tanks and rotors, q, r, (Figure 5), somewhat similar to those described before, form a seal at both ends to a treatment chamber s, containing dry chlorine gas. The tanks or rotor chambers, a, b, contain an inert sealing fluid, e. g., liquid carbon tetrachloride, and the ends of the spokes are furnished with rollers t. Fixed rollers u may also be provided as shown. The drums may have been more or less heated to render them dry. Their action through the tank q, is similar to the previous description and the drums then are carried through the gas chamber, s, where the detinning takes place; the drums then passing out through the second seal, r, to the open where the contents of the bales, after draining, are conveniently pressed.

In the arrangement illustrated by Figure 6, the treating chamber s is formed with an additional pair of rotors, v, v in addition to the sealing rotors q at each end of the treating chamber, thus giving a longer path through the treating chamber for the containers a.

In the arrangement illustrated in Figures 7 and 8, members w are attached to the spokes of the wheels d and cross-members x carry a strip of rubber v which sweeps the surface of the cathode z carrying the metal deposited by the passage of a suitable current through the container as anode to the cathode, to a sump z' during revolution of the spoked wheel.

The rubber strips v may be arranged parallel to or at an angle to the axis of the spoked wheel.

The cathode z is of course insulated from the semi-cylindrical tank e.

Having now described our invention, what we claim as new and desire to secure by Letters Patent is:—

1. A process for the treatment of loosely bundled materials, such as fragments of tinned scrap, with a stripping fluid, which consists in forming the material into cylindrical bundles and passing these bundles with a rolling motion in series, through a treating vessel.

2. A process as claimed in claim 1 in which electrolysis is arranged to take place in the treating vessel.

3. Apparatus for carrying out the process as claimed in claim 1 including a perforated cylindrical vessel containing the material to be treated, a treating vessel containing a stripping fluid and a wheel with spokes between which spokes the cylindrical containers are carried.

4. Apparatus for carrying out the process as claimed in claim 1 including a perforated cylindrical vessel containing the material to be treated, a treating vessel containing a stripping fluid and a wheel with spokes between which spokes the cylindrical containers are carried the treating vessel being formed as a semi-cylindrical trough containing a stripping liquid.

5. Apparatus for carrying out the process as claimed in claim 1 including a perforated cylindrical vessel containing the material to be treated, a treating vessel containing a stripping fluid and a wheel with spokes between which spokes the cylindrical containers are carried the treating vessel being formed as a semi-cylindrical trough containing a stripping liquid and means for circulating the stripping liquid through the treating vessel.

6. Apparatus for carrying out the process as claimed in claim 1 including a perforated cylindrical vessel containing the material to be treated, a treating vessel containing a stripping fluid and a wheel with spokes between which spokes the cylindrical containers are carried the treating vessel being formed as a semi-cylindrical trough containing a stripping liquid, means for circulating the stripping liquid through the treating vessel, an electrode arranged in, but electrically insulated from the treating vessel, a source of electrical energy and a circuit associated therewith in which the cylindrical bundle forms an anode, the treating liquid the electrolyte and the said electrode the cathode.

7. Apparatus for carrying out the process as claimed in claim 1 including a perforated cylindrical vessel containing the material to be treated, a treating vessel containing a stripping fluid and a wheel with spokes between which spokes the cylindrical containers are carried the treating vessel being formed as a semi-cylindrical trough containing a stripping liquid, means for circulating the stripping liquid through the treating vessel, an electrode arranged in, but electrically insulated from the treating vessel, a source of electrical energy, a circuit associated therewith in which the cylindrical bundle forms an anode, the treating liquid the electrolyte and the said electrode the cathode and mechanical means for removing the electrolytic deposit from said cathode.

8. Apparatus for the treatment of loosely bundled materials with a stripping fluid including a plurality of perforated cylindrical vessels each containing a cylindrical bundle of the material to be treated, a treating chamber containing a gaseous stripping fluid and a liquid seal chamber at each end of said treating chamber containing spoked wheels between the spokes of which the cylindrical bundles pass in series through said liquid sealed treating chamber.

In testimony whereof we have signed our names to this specification.

MATTHEW ATKINSON ADAM.
JOHN FIELDHOUSE.
ROBERT BAILLIE.